June 21, 1960 W. H. SALE 2,941,849
JOURNAL STOP
Filed March 26, 1957 2 Sheets-Sheet 1
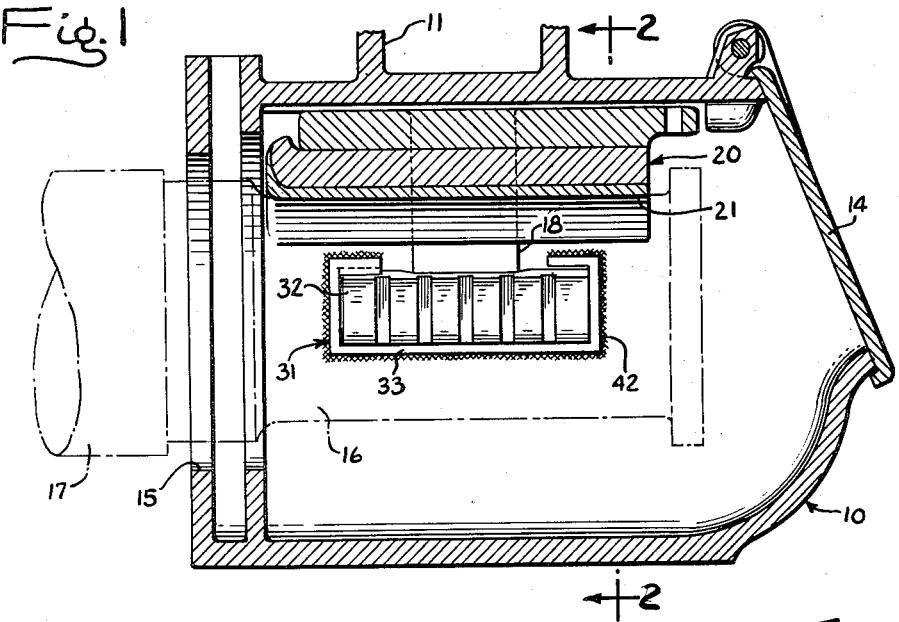
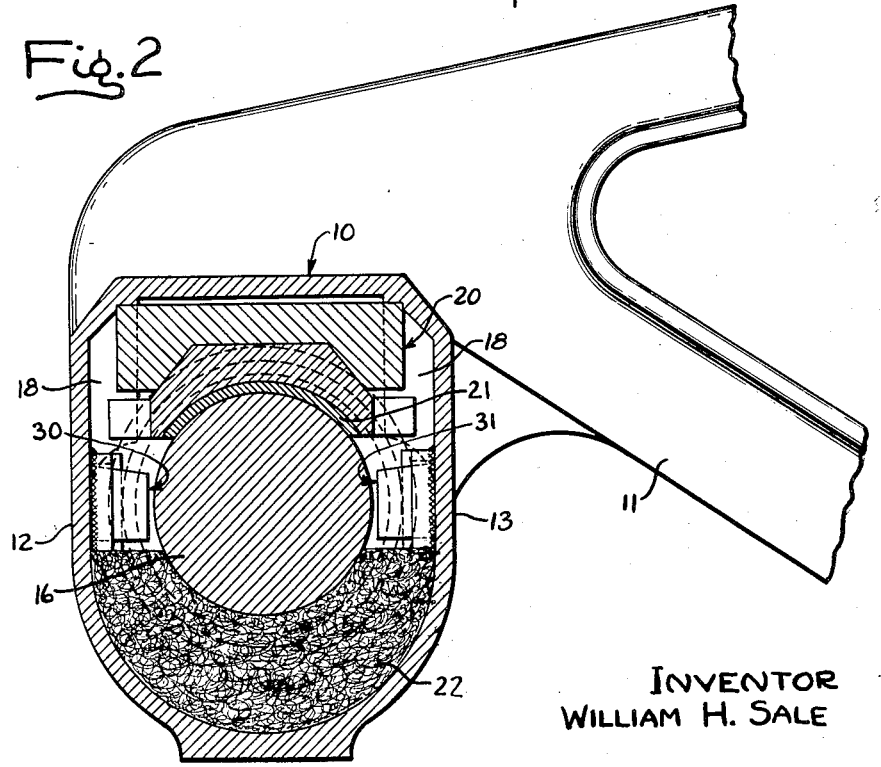
INVENTOR
WILLIAM H. SALE
ATTYS.

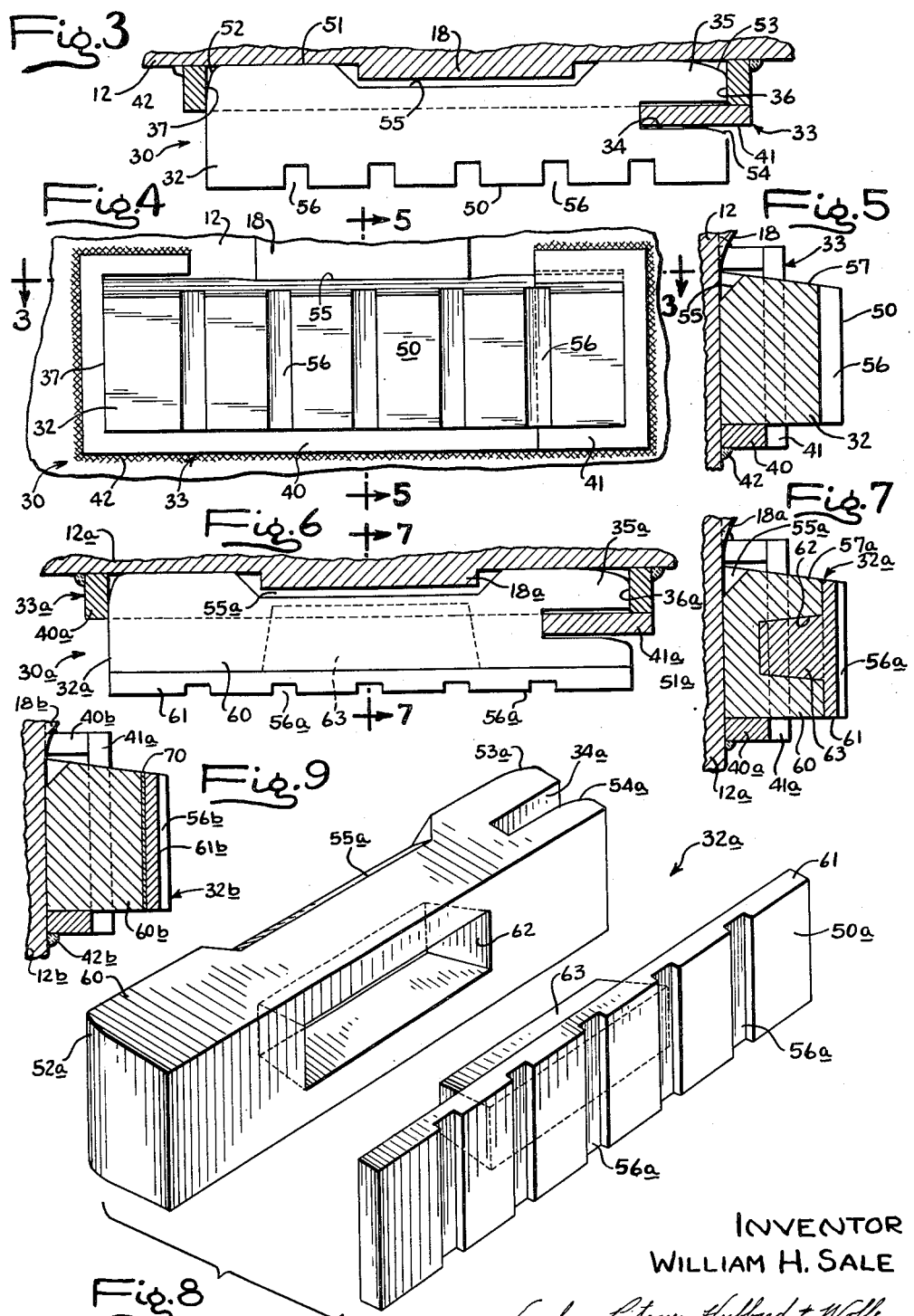

United States Patent Office 2,941,849
Patented June 21, 1960

2,941,849
JOURNAL STOP

William H. Sale, Sandston, Va., assignor, by mesne assignments, to The Journalstop Company, Chicago, Ill., a corporation of Illinois Filed Mar. 26, 1957, Ser. No. 648,567

8 Claims. (Cl. 308—40)

The present invention relates to the construction of railroad journal boxes and more particularly to an axle stop mounted in a journal box for preventing lateral axle movement therein.

A commonly recognized problem in the construction and operation of railroad cars having conventional journal boxes for supporting the car on its axles, is the fact that considerable relative movement between the journal box and the axle journal is encountered during operation. Indeed, when the brakes of a car are applied, the journal may move laterally as much as an inch and a half to two inches relative to the journal box. Track imperfections encountered at high speed, or bouncing or jarring of the car, may likewise cause considerable movement of the axle beneath the car supporting bearing or "brass." In extreme cases, this lateral axle movement causes the axle journal to twist out from under the overlying supporting bearing and results in "waste grab" or in scoring and overheating of the journal. The former is a situation wherein the journal lubricant retaining material, or waste, lying at the bottom of the journal box, is pinched between the axle journal and the brass where it abruptly interrupts the smooth bearing action, heats rapidly as a result of the friction developed, and often causes the lubricant to ignite, a dangerous situation referred to as a "hot box."

In addition to these more extreme problems, pronounced lateral movement of the axle tends to break down and shorten the effective life of the dust guard seal, which is the unit surrounding the axle at the point where it enters the journal box for sealing the box against escape of the lubricant or entry of foreign material. It can be readily appreciated that when the rapidly rotating axle is jarred back and forth within the dust guard seal an extremely high rate of seal wear inevitably occurs.

One proposed solution to the above problems is to provide a journal box with journal abutments or stops which are closely supported on either side of the axle journal so as to intercept and prevent the undesired lateral axle movement. This solution has been long recognized in the railroad art and many forms of journal stops have been proposed. However, prior stops for this purpose have usually proven impractical; requiring modification of the axle journal, the journal box or both; being too expensive to manufacture or install to justify the advantage of a stop; or proving unworkable and ineffective in actual practice.

Accordingly, it is the general aim of this invention to provide a railroad axle journal stop that effectively operates within a conventional journal box in conjunction with any conventional axle journal, and which is economical to manufacture, simple and convenient to install, and permits replacement of worn parts without requiring time-consuming, and thus expensive, manipulation of stop fasteners or securing devices.

In more detail it is an object to provide a solid, sturdy, easy to manufacture, journal stop together with a simply formed supporting bracket cooperable with the stop and adapted for permanent installation in a journal box, the stop and bracket being formed to permit both the direct insertion of the stop into the bracket where it will be firmly contained and snugly positioned without auxiliary fasteners, and the direct removal of the stop from the bracket without disturbing the bracket or requiring the use of tools. In more detail, it is a collateral object to provide a stop and bracket of the type characterized above which permits the stop to be formed from a wide variety of materials.

In one of its aspects, it is an object of the invention to provide a journal stop of the above type that will absorb and cushion the jarring action normally associated with abutment stops without altering the effective functioning of the stop in preventing lateral axial movement. It is a related object to provide a journal stop of this type having the cushioning effect just referred to as well as an impact face presenting a frictionless bearing surface for reducing rubbing friction when the axle engages the stop.

With more particularity, it is an object to provide a journal stop and supporting bracket formed so that the forces absorbed by the stop in arresting the lateral shifting of the axle are transferred directly to the journal box structure itself and are not imposed on the supporting and positioning bracket.

Other objects and advantages of the invention will become apparent upon reading the attached detailed description and upon reference to the drawings, in which:

Figure 1 is a longitudinal, cross-sectional view of a railroad journal box, in which the axle is outlined in dot-dash lines, utilizing a journal stop constructed according to the present invention.

Fig. 2 is a transverse sectional view taken along line 2—2 of Fig. 1.

Fig. 3 is a plan view of a single one of the journal stops shown in Figs. 1 and 2 and is taken along line 3—3 in Fig. 4.

Fig. 4 is an elevation view of one of the journal stops shown in Figs. 1 and 2.

Fig. 5 is a transverse sectional view taken along line 5—5 of Fig. 4.

Fig. 6 is a plan view similar to Fig. 3 showing a modified form of stop structure.

Fig. 7 is a transverse sectional view taken along line 7—7 of Fig. 6.

Fig. 8 is an exploded perspective view of the modified stop shown in Figs. 6 and 7.

Fig. 9 is a transverse sectional view similar to Fig. 7 showing still another modified form of journal stop.

While the invention will be described in connection with certain preferred embodiments, it will be understood that I do not intend to limit the invention to those embodiments. On the contrary, I intend to cover all alterations, modifications and equivalents as may be included within the spirit and scope of the invention as defined by the appended claims.

Turning first to Figs. 1 and 2, there is shown a railroad journal box 10 of conventional design supported at the end of a railroad truck frame member 11. The box 10 is formed as a single casting having two parallel side walls 12 and 13, a front access opening closed by a hinged cover 14, and a rear annular opening 15 which receives the journal portion 16 of an axle 17. Supporting the journal box 10 on the axle journal 16 is a bearing structure 20 which includes the conventional arcuate "brass" 21 resting on the periphery of the axle journal 16. It will be understood that the bearing structure 20 supports the journal box 10 on the axle 17, and that the journal box 10, through the truck frame 11, supports the weight of the railroad car. It will also be apparent that the axle journal 16 is free to rotate beneath the "brass" 21.

To lubricate the rotation of the axle beneath the supporting bearing 20, the lower portion of the journal box is stuffed with a lubricant impregnated material, or "waste," 22 (see Fig. 2) which contacts the lower segment of the axle journal 16 and thus keeps the periphery of the axle journal coated with lubricant.

To prevent the bearing structure 20 from shifting within the journal box 10, positioning lugs 18 are formed integrally at the top center of each of the journal box sidewalls 12, 13 and the bearing structure 20 is grooved to slidingly fit between the lugs. It can be seen that shifting of the bearing structure 20 is prevented by the engagement of the lugs 18 with the bearing grooves.

In order to arrest and thus limit lateral shifting movement of the axle 17 relative to the journal box 10, journal stops 30 and 31, constructed in accordance with the present invention, are mounted closely adjacent each side of the axle. Each of the stops 30, 31 include an elongated block 32 and a bracket 33 which is secured to one of the side walls 12, 13 of the journal box for supporting and positioning the respective blocks 32 therein. It can be seen that any tendency of the axle to shift laterally of the box 10 will bring the journal 16 into abutting engagement with one of the stops 30, 31 so that only a limited amount of shifting is permitted. In a practical case, the blocks 32 of the stops 30, 31 may be spaced about ⅜ of an inch on either side, and level with the centerline, of the axle journal 16.

The journal stops 30, 31 are mirror images of one another so that there is a left hand stop 30 supported on the journal sidewall 12 and a right hand stop 31 supported on the wall 13. For convenience, only the stop 30 will be described in detail but it will be understood that the journal stop 31 is identical except for being a mirror image.

For firmly but releasably supporting the block 32 in the bracket 33 to constitute the journal stop 30 embodying the invention, the block and bracket are formed with mounting means which includes cooperating lug and socket structure disposed parallel to the axle 17 so that the block may be moved axially of the journal 16 to effect interfitting of the lug and socket, and the bracket is also provided with a cradle to receive the block when the lug and socket are interfitted, so that when the block is in place axial movement of the block is prevented and the interfitting lug and socket holds the block firmly in position.

In the preferred embodiment, as shown in Figs. 3–5, the block 32 is solid, generally rectangular and has a slot or socket 34 formed at one end defining a positioning lug 35. Cooperating with the lug 35 is a socket or recess 36 formed by the bracket 33. In order to retain the lug 35 within the socket 36 and thus positively support the block 32 in position, the bracket 33 is formed to provide a cradle 37 within which the block may be seated when the lug 35 and socket 36 are interfitted. In this way movement of the block 32 axially of the journal 16, which would withdraw the lug 35 from the socket 36, is prevented and the block 32 is thus retained in its proper position.

In order to form the socket 36 and the cradle 37, the bracket 33 comprises, in the illustrated embodiment, a single strip of material 40 formed having a generally C-shaped configuration at each end. The C-shaped configuration at the left of Fig. 4 defines the cradle 37, and a plate or lug 41, which is secured to the bracket 33 and disposed over the C-shaped configuration at the right of Fig. 4, defines the socket 36.

In order to mount the stop 30 within the journal box 10, the bracket 33 is directly secured to the sidewall 12. This has been advantageously accomplished in the preferred embodiment by properly positioning the bracket 33 against the sidewall 12 and drag welding, as indicated at 42, the bracket to the side wall around the outer accessible edges of the strip 40.

When the block 32 is properly positioned within the bracket 33, as indicated in Figs. 3–5, it can be seen that the block will be axially alined with the axle journal 16 and will present an impact face 50 closely disposed to the periphery of the axle journal while the rear face 51 of the block 32 is engaged flatly against the journal box sidewall 12. When the axle 17 shifts laterally with respect to the journal box 10, the axle journal 16 is brought into abutting engagement with the impact face 50 of the block 32, thus arresting and limiting the lateral shifting of the axle and transmitting the impact force directly to the sidewall of the journal box through the rear face 51 of the block 32. In this way, the bracket 33 serves only a positioning function and is not called upon to withstand any of the substantial stresses required to arrest lateral shifting of the axle 17.

It can be readily seen that when the rapidly rotating axle journal 16 is brought into slamming engagement with the impact face 50 of the block 32, substantial wearing of the block must inevitably occur. When the block becomes too worn for further effective use, it may be simply removed from the bracket 33 by lifting its end from the cradle 37 and sliding the lug 35 outwardly from the socket 36. A new block 32 may then quickly be provided as a replacement by reversing the procedure. Thus, although the block 32 is snugly and firmly positioned within the bracket 33 in proper relation to the axle journal 16, it may be simply removed and replaced without tools or special equipment. It will be understood by those skilled in the art that the above procedure is intended to be performed after the axle 17 has been dropped and withdrawn from the journal box 10 in accordance with the conventional practice followed in maintaining and inspecting railroad journal boxes. It can be seen that when the journal box is assembled, the close proximity of the axle journal 16 to the impact surface 50 of the block 32 prevents the block from slipping from the saddle 37, and thus the block remains snugly positioned within its supporting bracket 33 without the use of bolts or other auxiliary fasteners.

So that the block 32 may be easily slipped into and out of the supporting bracket 33, the sharp corners of the block which would snag and restrict its manipulation are relieved or rounded, as at 52, 53 and 54 (see Fig. 3). In this way the block can be freely inserted into, and withdrawn from, the bracket 33.

It will be appreciated that when the axle journal 16 slams into the impact face of one of the journal stops 30, 31 the impact face will have a wiping effect on the periphery of the journal that will prevent lubricant from being carried by the journal from the oil impregnated waste 22 upwardly to the bearing brass 21. To permit the journal and bearing to be properly lubricated even though the journal remains urged into contact with one of the stops 30, 31, the impact face 50 of each journal stop is provided with a series of vertically extending grooves 56 which provide passages allowing the axle journal 16, although in contact with an impact face 50, to carry lubricant upwardly, through the grooves 56, to the bearing brass 21.

To avoid the accumulation of lubricant on the tops of the stops 30, 31, each of the blocks 32 have their upper surfaces 57 tapered downwardly and forwardly. In this way journal lubricant splashing onto the blocks 32 will run off the surfaces 57 and back to the waste 22.

To avoid interference with the positioning lugs 18 formed integrally on the side walls of the journal box 10, the blocks 32 are provided with relieved edges 55 permitting the blocks to be supported closely beneath the lugs 18 without mutual interference.

The material from which the blocks 32 of the journal stops 30, 31 is formed may advantageously be, in one aspect of the invention, a resilient compressible material such as rubber or neoprene. By providing a journal stop formed of a solid block of compressible material, the forces created in arresting the lateral shifting of the axle journal are cushioned by the stop so that no sudden, jarring, forces are imposed upon the walls of the journal box 10. Furthermore, the rear face 51 of a resilient block 32 tends to grip the face of the sidewall 12 more firmly and without slippage when a force is imposed upon the impact face 50 of the block. Thus, when the rapidly rotating axle journal 16 moves into contact with the impact face 50, the block is restrained from the slightest sliding motion along the wall 12 so that none of the impact force is imposed on the bracket 33, but rather is entirely transmitted to the wall of the journal box 10. To reduce the friction between the rapidly rotating axle journal 16 and the impact face 50 when they come into contact, the resilient material forming the block 32 may be impregnated with a suitable lubricant such as graphite.

Although forming the block 32 of the stops 30, 31 of a resilient material has the definite advantages referred to above, it is also contemplated that the block may be formed from a variety of other materials, for example, brass, aluminum or an impact resistant "plastic."

In order to retain the advantages of a resilient journal stop while also providing a metallic, friction reducing, impact face for the stop, the block of each journal stop, in one aspect of the invention, may comprise a resilient base block carrying an impact plate formed of a friction reducing material. This modification of the invention is illustrated in Figs. 6–8 wherein elements similar to those described above have been given the identical numeral with the distinguishing suffix *a* added. As therein shown, the stop 30*a* comprises a bracket 33*a*, identical to bracket 33 described above, and a block 32*a*, having an outer configuration identical to the block 32 described above. The block 32*a* comprises a resilient base 60 and an impact plate 61 formed of a bearing material, such as brass. The impact plate 60 presents an impact face 50*a* having formed therein vertical grooves 56*a* providing lubricant passages for the purpose discussed above.

To secure the base 60 and the impact plate 61 together to form the unitary block 32*a*, the base 60 is formed with a socket 62, which in the illustrative embodiment, is generally rectangular, and the impact plate 61 is formed with a complementary lug 63 proportioned to fit snugly within the socket 62. Both the socket 62 and the lug 63 are slightly tapered so that the latter may be firmly wedged within the socket to thus securely mount the impact plate 61 on the base 60. It will be appreciated that when the impact plate 61 becomes too worn for further use, the block 32*a* may be removed, the worn impact plate 61 loosened and replaced, and the renewed block 32*a* again positioned within its bracket 33*a*. Thus, the block base 60 need not be replaced each time a worn impact face is renewed.

As an alternative method of securing an impact plate to a resilient base, the plate and base may be adhesively bonded together along a seam 70, as illustrated in Fig. 9 in which parts similar to those described above are given identical numerical designation with the distinguishing suffix *b* added. It can be seen that a resilient base 60*b* is secured along a bonded seam 70 to an impact plate 61*b* to form a block 32*b* similar in outer configuration and function to the blocks described above.

I claim as my invention:

1. A journal stop adapted for mounting laterally adjacent an axle journal in a railroad journal box so as to cushion and arrest lateral axle journal movement, comprising an elongated resilient block having a rear surface adapted to fit flush against a side wall of such journal box, an abutment plate formed of a friction reducing bearing material secured to said block on the side opposing said rear surface, said abutment plate and said block being formed with a mating anchoring lug and socket for securing the abutment plate on the block, said stop thus presenting both a friction reducing impact face adapted to contact a rapidly rotating, laterally shifting axle journal and a resilient cushioning support for said abutment plate effective to transfer impact forces without jarring such journal box in which the stop is adapted to be mounted, and a bracket adapted to be mounted on such side wall so as to define with the block interfitting lug and socket structure with the lug extending longitudinally of the block and the socket snugly receiving said lug so that the lug and socket structure may be separated by moving the block in only one direction, said bracket also defining a C-shaped cradle embracing said block in opposed relationship to and opening toward said interfitting lug and socket structure whereby movement of the block is prevented in the said one direction unless such axle journal is moved and the block is swung out of the cradle.

2. In a journal box having a generally vertical side wall laterally alined with an axle journal, a journal stop for limiting lateral axle journal movement toward said side wall comprising, in combination, a block having a rear face abutting said side wall and an opposite impact face disposed contiguous to said journal, and a bracket disposed on said side wall so as to define with said block interfitting lug and socket structure with the lug extending longitudinally of the block and the socket snugly receiving the sides of said lug so that the lug and socket structure may be separated by moving the block in only one direction along said side wall, said bracket also defining a C-shaped cradle embracing said block in opposed relationship to and opening toward said interfitting lug and socket structure so as to prevent movement of the block in said one direction unless said axle journal is moved and the block is swung from said side wall and out of the cradle.

3. In a journal box having a generally vertical side wall laterally alined with an axle journal, a journal stop for limiting lateral axle journal movement toward said side wall comprising, in combination, a block having a rear face abutting said side wall and an opposite impact face disposed closely adjacent to said axle journal, said block being formed of resilient material both for cushioning axle journal impact and for gripping the side wall under impact, and a bracket disposed on said side wall and defining with said block interfitting lug and socket structure with the lug extending longitudinally of the block and the socket snugly receiving the sides of said lug so that the lug and socket structure may be separated by moving the block in only one direction along said side wall, said bracket also defining a C-shaped cradle embracing said block in opposed relationship to and opening toward said interfitting lug and socket structure so as to prevent movement of the block in said one direction unless the axle journal is moved and the block is swung from said side wall and out of the cradle.

4. In a journal box having a generally vertical side wall laterally alined with an axle journal, a journal stop for limiting lateral axle journal movement toward said side wall comprising, in combination, a block having a rear face abutting said side wall and an opposite impact face disposed contiguous to said axle journal, said block having a longitudinally extending lug at one end spaced behind said impact face, means on said side wall defining a socket snugly receiving said lug so as to allow movement of the block in only one direction along said side wall, and means on said side wall defining a cradle embracing the top, bottom and end of said block which is opposite to the end having said lug, each of said means thus combining to lock said block in place until said axle journal is moved and the block is swung out of said cradle and urged in the said one direction to free said lug from said socket.

5. For use in a journal box having a side wall laterally alined with an axle journal, a journal stop for limiting lateral axle journal movement toward said side wall comprising, in combination, an elongated block having a rear side wall abutting face and an opposite axle journal impact face, and a bracket adapted to be mounted on said side wall so as to define with said block interfitting lug and socket structure with the lug extending longitudinally of the block and the socket snugly receiving the sides of said lug so that the lug and socket structure may be separated by moving the block in only one direction, said bracket also defining a C-shaped cradle embracing said block in opposed relationship to and opening toward said interfitting lug and socket structure whereby movement of the block is prevented in said one direction unless such axle journal is moved and the block is swung out of the cradle.

6. For use in a journal box having a side wall laterally alined with an axle journal, a journal stop for limiting lateral axle journal movement toward said side wall, comprising, in combination, an elongated block having a rear side wall abutting face and an opposite axle journal impact face, said block being formed of resilient material both for cushioning journal impact and for gripping the side wall under impact, said block having a longitudinally extending lug at one end spaced behind said impact face, means defining a socket snugly receiving said lug so as to allow movement of the block in only one direction, means defining a cradle embracing the top, bottom and end of said block which is opposite to the end having said lug, whereby each of said means combine to lock said block in place unless such axle journal is moved and the block is swung out of said cradle and urged in the said one direction to free said lug from said socket.

7. A journal stop for limiting generally lateral movement of an axle journal toward a journal box wall portion that is disposed substantially in lateral alinement therewith, said stop comprising, in combination, a block having a rear face adapted to abut such wall portion and an impact face adapted to be disposed closely adjacent to such axle journal, and mounting means for mounting the block to such wall portion, said mounting means including interfitting lug and socket portions and a C-shaped cradle portion opening toward the lug and socket portions, said lug portion extending generally longitudinally relative to the block and being snugly received within the socket portion when the block is mounted to such wall portion with the socket portion enabling the lug portion to be separated therefrom by movement of the block portion in only one direction along such side wall, said cradle portion embracing said block in opposed relationship to the lug and socket portions when the block is so mounted, whereby movement of the block is prevented in said one direction unless such axle journal is moved and the block is swung from such wall portion and out of the cradle.

8. In a journal box having a wall portion disposed substantially in lateral alinement with an axle journal, a journal stop for limiting generally lateral movement of such axle journal toward said wall portion, said journal stop comprising, in combination, a block having a rear face abutting the wall portion and an impact face adapted to be disposed contiguous to such axle journal, and mounting means for mounting the block to the wall portion, said mounting means including interfitting lug and socket portions and a C-shaped cradle portion opening toward the lug and socket portions, said lug portion extending generally longitudinally relative to the block and being snugly received within the socket portion when the block is mounted to the wall portion with the socket portion enabling the lug portion to be separated therefrom by movement of the block portion in only one direction along the side wall, said cradle portion embracing said block in opposed relationship to the lug and socket portion when the block is so mounted on the wall portion, whereby movement of the block is prevented in said one direction unless such axle journal is moved and the block is swung from the wall portion and out of the cradle.

References Cited in the file of this patent

UNITED STATES PATENTS

| | | |
|---|---|---|
| 701,065 | Magee | May 27, 1902 |
| 1,941,486 | Pilcher | Jan. 2, 1934 |
| 2,337,795 | Austin | Dec. 28, 1943 |
| 2,533,917 | Buckuis et al. | Dec. 12, 1950 |
| 2,733,966 | Ryan | Feb. 7, 1956 |